United States Patent [19]
Furuta

[11] Patent Number: 5,828,193
[45] Date of Patent: Oct. 27, 1998

[54] INTAKE AIR AMOUNT CONTROL UNIT FOR ENGINE

[75] Inventor: Akira Furuta, Tokyo, Japan

[73] Assignee: Mitsubushi Denki Kabushiki Kaisha, Tokyo, Japan

[21] Appl. No.: 796,554

[22] Filed: Feb. 7, 1997

[30]    Foreign Application Priority Data

Jun. 20, 1996  [JP]  Japan ................................. 8-160198

[51] Int. Cl.$^6$ .................................................. H02K 23/00
[52] U.S. Cl. ......................... 318/254; 318/599; 318/439; 318/138; 123/399
[58] Field of Search .................................. 318/599, 254, 318/439, 138; 123/399

[56]            References Cited

U.S. PATENT DOCUMENTS

| 5,463,298 | 10/1995 | Kamio et al. ........................... | 318/599 |
| 5,501,201 | 3/1996 | Miyoshi et al. ........................ | 318/599 |
| 5,606,950 | 3/1997 | Fujiwara et al. ....................... | 123/399 |
| 5,669,351 | 9/1997 | Shirai et al. ........................... | 123/399 |

FOREIGN PATENT DOCUMENTS 5240070  9/1993  Japan .

*Primary Examiner*—Karen Masih
*Attorney, Agent, or Firm*—Sughrue, Mion, Zinn, Macpeak & Seas, PLLC

[57]                ABSTRACT

An intake air amount control unit for an engine which is inexpensive and has excellent controllability is constituted such that a PWM duty signal output device calculates a phase current value to be applied to each stator winding of a brushless motor based on an opening difference between an actual opening of a throttle valve and a target opening of the throttle valve and outputs a PWM duty signal corresponding to this calculated phase current value. A rotor magnetic pole position learning device detects and learns a magnetic pole position of a rotor of the brushless motor, and an energization stator winding determining device determines a stator winding to be energized from an opening of the throttle valve and the above learned value. A motor drive device supplies a current to the brushless motor based on the above PWM duty signal and an energization phase selection signal corresponding to the determined stator winding to be energized.

14 Claims, 13 Drawing Sheets

INTAKE AIR AMOUNT CONTROL UNIT FOR ENGINE

BACKGROUND OF THE INVENTION

1. [Field of the Invention]

This invention relates to an intake air amount control unit for controlling the amount of intake air to be supplied to an engine by moving a throttle valve by means of a brushless motor.

2. [Description of the Prior Art]

In an ordinary vehicle, there is provided a throttle valve in an intake air passage of an engine, which is opened or closed by a driver's operation of an accelerator. Thereby the amount of intake air of the engine is controlled by the amount of the operation of an accelerator pedal. The control of the amount of intake air can be effected by coupling the throttle valve with the accelerator pedal by mechanical connection means such as a link or a wire. However, a vehicle using such mechanical connection means has such a problem that the positional relation between the accelerator pedal and the throttle valve is restricted, thereby reducing the freedom of installing positions in the vehicle.

In recent years, it has been necessary to control a throttle valve regardless of a driver's operation of the accelerator in the control of a constant-speed driving control apparatus and a traction control apparatus. An attempt has been made to control the throttle valve by electrically connecting the throttle valve by means of a motor. As an example of this, the control of a throttle valve as disclosed in Japanese patent Laid-open application No. 1-315641 is already known. In this prior art, a brushless motor is used to control a throttle valve because when a motor having a brush commutator is used, the pressure of the brush commutator makes difficult positional control due to a hysteresis torque generated in a direction opposite to the normal direction of a rotor.

Further, in the control of a throttle valve as disclosed in Japanese patent Laid-open application No. 5-240070, the rotor of a brushless motor and the rotary axis of a throttle valve are coupled by a reduction gear or a gear to achieve the high-precision controllability of the throttle valve. A high-cost high-precision rotation detector is made unnecessary by providing a counter voltage detector for detecting a counter voltage generated in a stator winding (to be referred to as "phase" hereinafter) of a brushless motor or a current switch detector to switch the phase of the brushless motor.

However, the control of the amount of intake air for an engine which is effected by controlling a throttle valve in the prior art has the following problems.

First, since a counter voltage detector or a current switch detector is required to switch the energization phase of a brushless motor, a throttle actuator becomes complicated and bulky, and an interface for receiving a signal from a motor controller must be added. When the energization phase is changed based on a signal from a throttle opening sensor, the dislocation of the energization phase switching position is caused by the production tolerance of a reduction gear or a throttle opening sensor. Further, when one energization phase is to be switched to another energization phase based on the output of a counter voltage detector or a phase current switch detector for driving a brushless motor, a current suddenly changes. Therefore, if the signal of the detector is dislocated with respect to a change in magnetic flux applied to the phase due to this sudden change, the generation torque of the motor becomes discontinuous with the result that the opening of the throttle suddenly changes.

To eliminate this problem, it is conceivable to adopt a three-phase energization system in which an electric current is supplied to phases A to C independently in the form of a sine wave. However, this system requires a detector for precisely measuring the rotation angle of the rotor of a motor.

SUMMARY OF THE INVENTION

It is therefore an object of the present invention which has been made to solve the above problems to provide an intake air amount control unit for an engine which is inexpensive and has excellent controllability.

An intake air amount control unit for an engine according to the present invention
includes rotor magnetic pole position learning means 22b for detecting and learning a magnetic pole position of the rotor;
energization stator winding determining means 22c for determining a stator winding to be energized from an opening of the throttle valve and a value learned by the rotor magnetic pole position learning means 22b; and
motor drive means 23 for supplying a current to the brushless motor 15 based on the PWM duty signal from the PWM duty signal output means and an energization phase selection signal corresponding to a stator winding to be energized determined by the energization stator winding determining means 22c.

The intake air amount control unit for an engine according to the present invention comprises rotor magnetic pole position learning means 22b for detecting and learning a magnetic pole position of the rotor based on the output of the throttle opening sensor.

The intake air amount control unit for an engine according to the present invention comprises rotor magnetic pole position learning means 22b for learning a magnetic pole position of the rotor by driving the brushless motor 15 stepwise.

The intake air amount control unit for an engine according to the present invention comprises rotor magnetic pole position learning means 22b for learning as a rotor magnetic pole position an average value of learned values of rotor magnetic pole positions from the totally closed position of the throttle valve toward a totally opening direction and learned values of rotor magnetic pole positions from the totally opened position of the throttle valve toward a totally closing direction.

The intake air amount control unit for an engine according to the present invention comprises rotor magnetic pole position learning means 22b for carrying out the processing of learning a magnetic pole position of the rotor again when learning failure judging means judges that learning is a failure.

The intake air amount control unit for an engine according to the present invention comprises rotor magnetic pole position learning means 22b for judging that learning is a failure when the difference between a learned value in a direction of opening the throttle valve and a learned value in a direction of closing the throttle valve is larger than a predetermined value and for carrying out the processing of learning a magnetic pole position of the rotor again.

The intake air amount control unit for an engine according to the present invention comprises rotor magnetic pole position learning means 22b for judging that learning is a failure when the interval between learned values of magnetic pole positions of the rotor is larger than a predetermined value or smaller than a predetermined value and for carrying out the processing of learning a magnetic pole position of the rotor again.

The intake air amount control unit for an engine according to the present invention comprises rotor magnetic pole position learning means 22b for judging that learning is a failure when the number of rotor magnetic pole positions from the totally closed position of the throttle valve to the totally opened position thereof is not equal to a set value and for carrying out the processing of learning a magnetic pole position of the rotor again.

The intake air amount control unit for an engine according to the present invention include rotor magnetic pole position learning means 22b for detecting and learning a magnetic pole position of the rotor;

rotation angle detection means 22d for obtaining a rotation angle of the rotor based on a learned value of the rotor magnetic pole position learning means 22b and an opening of the throttle valve; and motor drive means 23 for supplying a current to the brushless motor 15 based on the PWM duty signal from the PWM duty signal output means 22a and the rotation angle of the rotor from the rotation angle detection means 22d.

The intake air amount control unit for an engine according to the present invention comprises rotor magnetic pole position learning means 22b for detecting and learning a magnetic pole position of the rotor from the output of the throttle opening sensor.

The intake air amount control unit for an engine according to the present invention comprises rotor magnetic pole position learning means 22b for learning a magnetic pole position of the rotor by driving the brushless motor 15 stepwise.

The intake air amount control unit for an engine according to the present invention comprises rotor magnetic pole position learning means 22b for carrying the processing of learning a magnetic pole position of the rotor again when learning failure judging means judges that learning is a failure.

The intake air amount control unit for an engine according to the present invention comprises rotation angle detection means 22d for determining a stator winding to be energized based on an opening of the throttle valve and a learned value of the rotor magnetic pole position learning means 22b to obtain a rotation angle of the rotor.

The intake air amount control unit for an engine according to the present invention comprises rotation angle detection means 22d for obtaining a rotation angle of the rotor by interpolating between a learned rotor magnetic pole position to the next rotor magnetic pole position with the output signal of the throttle opening sensor.

The above objects, features and advantages of the invention will become more apparent from the following description when taken in conjunction with the accompanying drawings.

DESCRIPTION OF THE PREFERRED EMBODIMENTS

Embodiment 1

Figure 1:
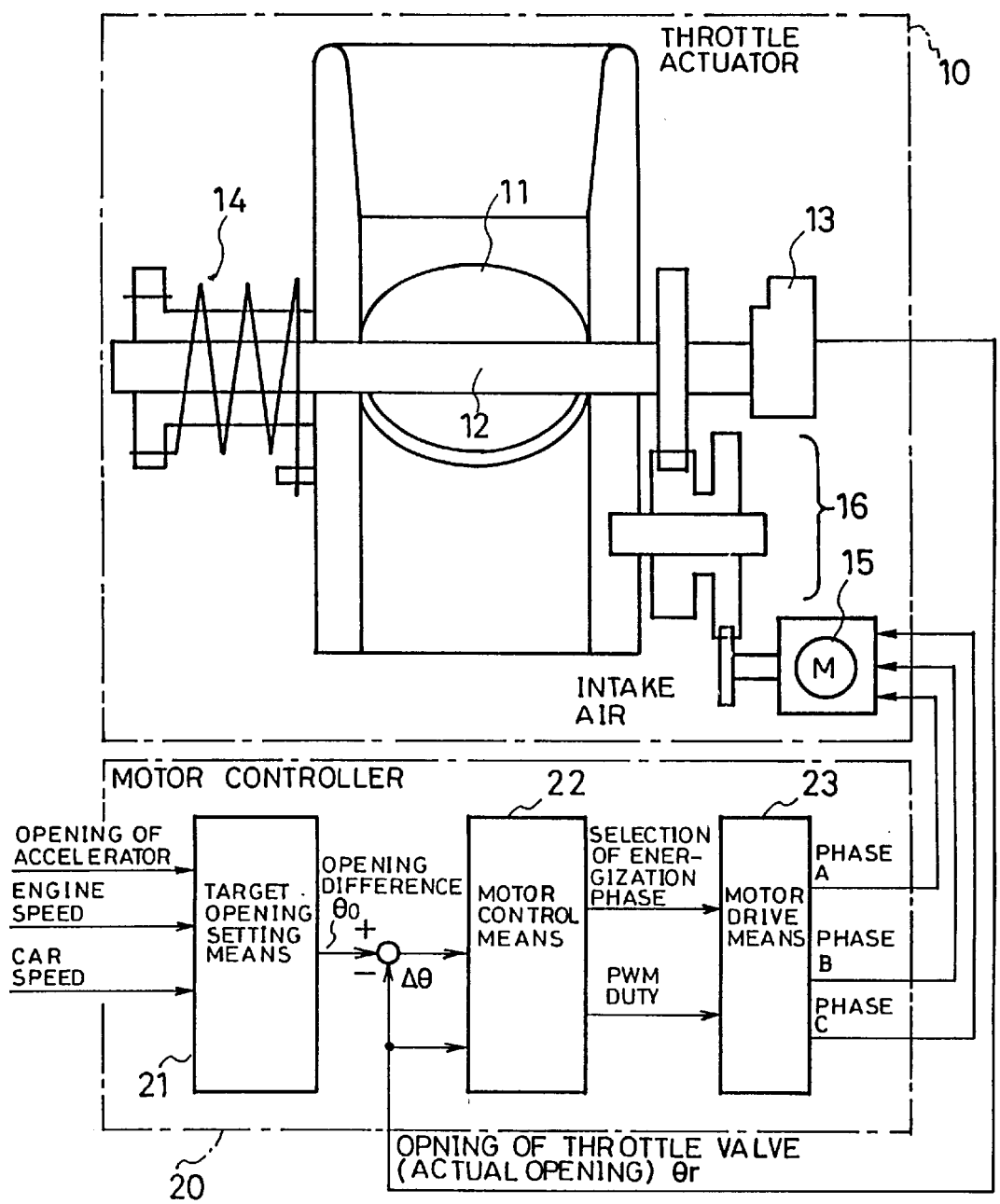
FIG. 1 is a diagram showing the entire configuration of an intake air amount control unit for an engine according to Embodiments 1 to 4 of the present invention.

With reference to the accompanying drawings, Embodiment 1 of the present invention will be described hereinunder. FIG. 1 is a diagram showing the configuration of an intake air amount control unit for an engine according to Embodiments 1 to 5 of the present invention. In FIG. 1, a throttle actuator 10 for adjusting the amount of intake air to be supplied to an engine (unshown) comprises a throttle valve 11 for changing the area of the opening of an intake air passage, a rotary axis 12 for supporting this throttle valve 11, a throttle opening sensor 13, provided at one end of the rotary axis 12, for detecting a rotation angle of the rotary axis 12 (opening of the throttle), a return spring 14, provided at the other end of the rotary axis 12, for urging the throttle valve 11 in a closing direction, a brushless motor 15 for controlling the throttle valve 11 and a reduction gear 16 for connecting the rotary axis 12 to the brushless motor 15.

A motor controller 20 for controlling the brushless motor 15 comprises target opening setting means 21 for receiving various data on a vehicle such as the opening of an accelerator indicating the amount that the accelerator is stepped upon, engine speed, car speed, etc. and for calculating a target throttle opening θo, motor control means 22 having means for calculating a PWM duty from an opening difference Δθ between an actual opening θr from the throttle opening sensor 13 and a target throttle opening θo and for selecting an energization phase of a motor from the throttle opening sensor 13, and motor drive means 23 for receiving the PWM duty from the motor control means 22 and for supplying a current to each phase of the motor.

Figure 2:
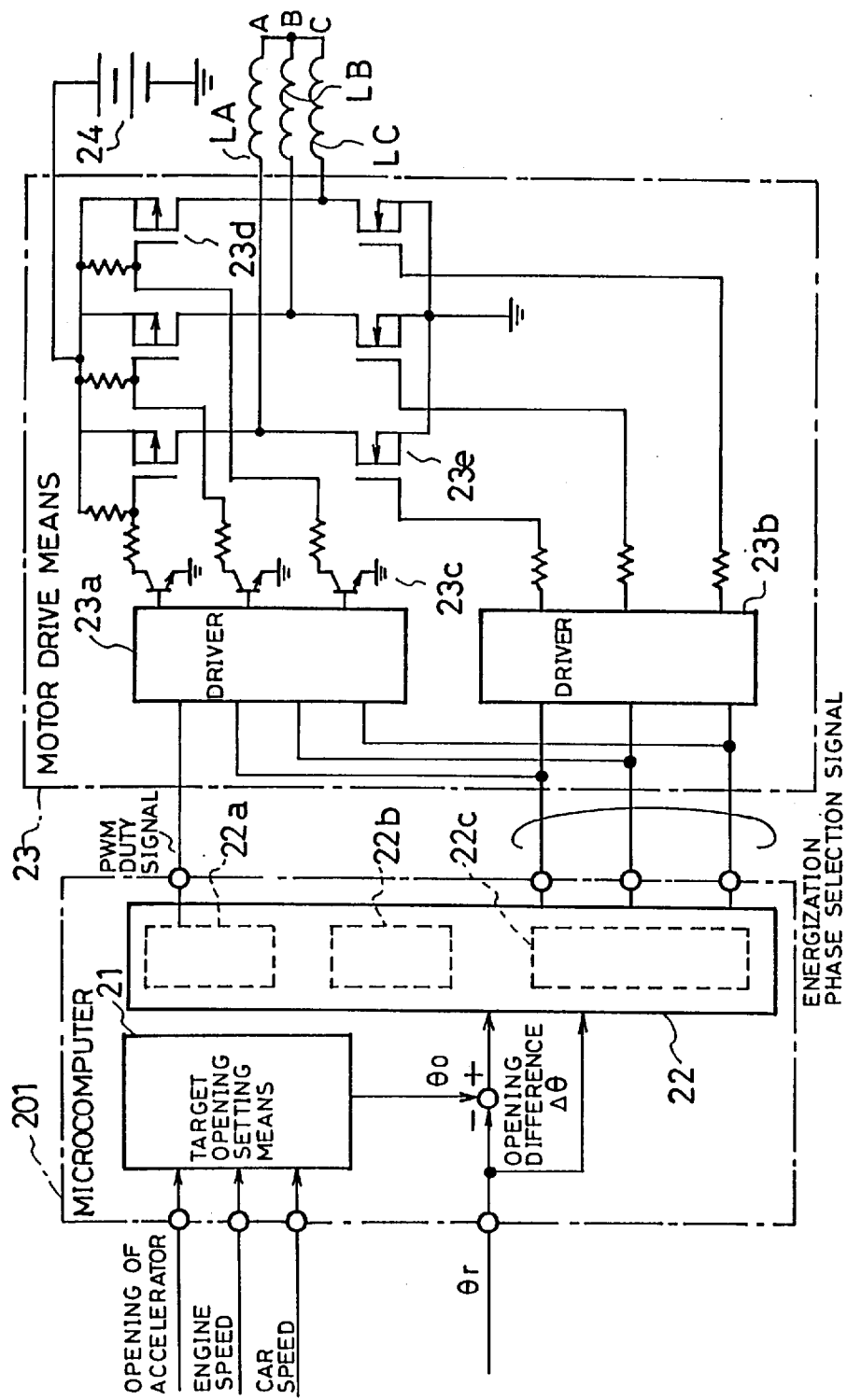
FIG. 2 is a circuit diagram of a controller in Embodiment 1.

FIG. 2 is a circuit diagram of the controller 20 shown in FIG. 1. In FIG. 2, a microcomputer 201 forms the target opening setting means 21 for setting the opening of the throttle valve 11 (see FIG. 1) based on various car information and the motor control means 22. The motor control means 22 comprises PWM duty signal output means 22a for calculating a phase current value to be applied to each of stator windings LA, LB and LC of the brushless motor 15 (see FIG. 1) based on an opening difference between an actual opening of the throttle valve obtained from the throttle opening sensor 13 (see FIG. 1) and a target opening of the throttle valve set by the target opening setting means 21 and for outputting a PWM (pulse width modulated) duty signal corresponding to this calculated phase current value, rotor magnetic pole position learning means 22b for detecting and learning a magnetic pole position of the rotor of the brushless motor 15, and energization stator winding determining means 22c for determining a stator winding to be energized from an opening of the throttle valve and a learned value of the rotor magnetic pole position learning means 22b. The motor drive means 23 supplies a current to the brushless motor 15 based on the PWM duty signal from the PWM duty signal output means 22a and an energization phase selection signal corresponding to the stator winding to be energized determined by the energization stator winding determining means 22c and includes a driver 23a formed of a logic circuit for driving an upstream-side drive stage, a former-stage switching element group 23c, a final-stage switching element group 23d, a driver 23b formed of a logic circuit for driving a downstream-side drive stage and a final-stage switching element group 23e. Phases A to C of the brushless motor 15 are connected between the positive pole of a battery 24 and a ground through the final-stage switching element group 23d and the final-stage switching element group 23e.

A description is subsequently given of the operations of the constituent elements of FIG. 1 and FIG. 2. The motor control means 22 causes the PWM duty signal output means 22a to provide a 50% PWM duty signal, for example, to the motor drive means 23 to instruct that the energization phase be switched to a direction for opening the throttle valve 11. According to this operation, the rotor of the brushless motor 15 stops stepwise at each energization phase switching position. Since this energization phase switching position corresponds to the magnetic pole position of the rotor of the brushless motor 15, the magnetic pole position of the rotor learned by the rotor magnetic pole position learning means 22b is referred to as "energization phase switching position" hereinafter.

Figure 3:
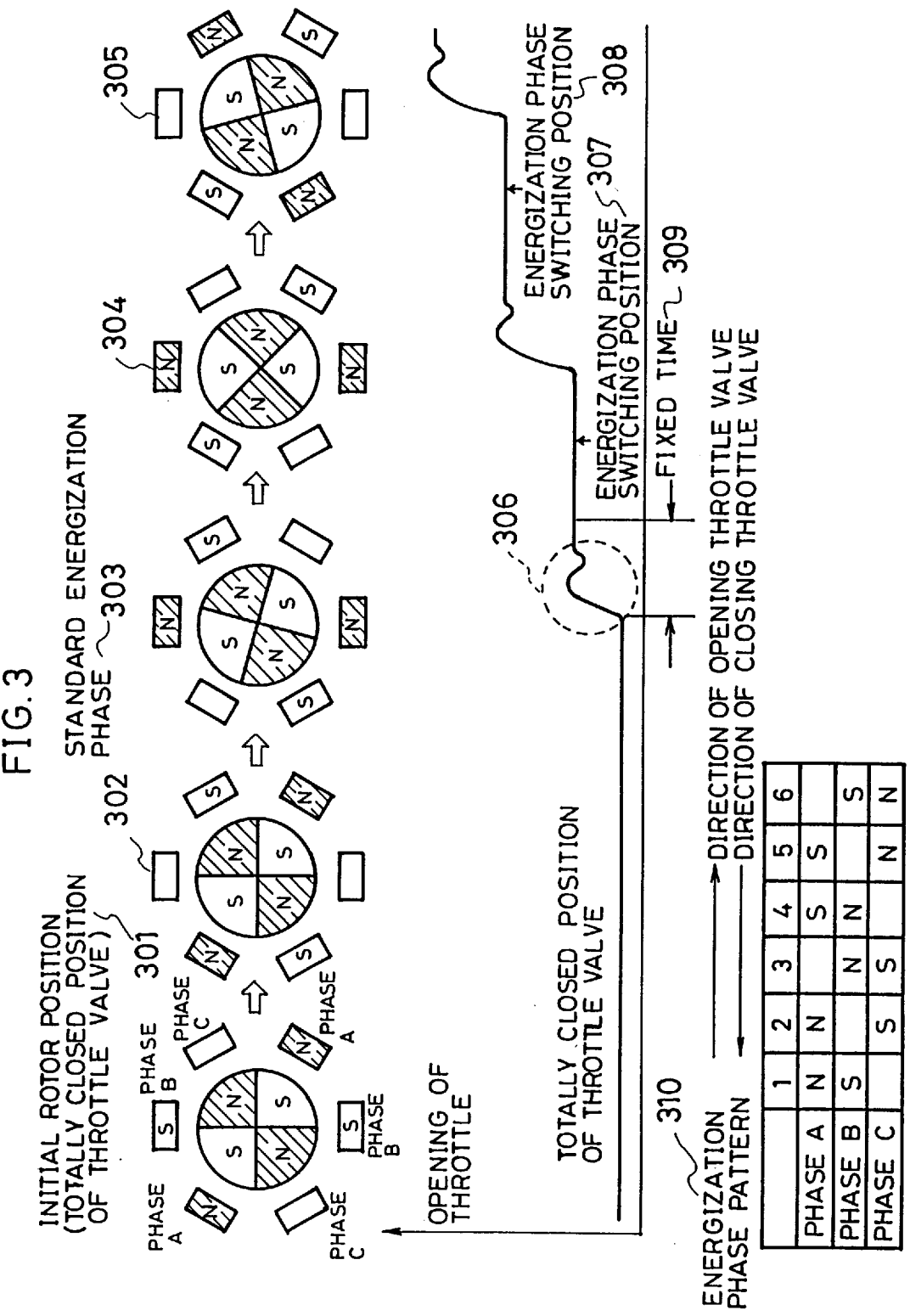
FIG. 3 is a diagram for explaining the learning of an energization phase switching position in Embodiment 1.

FIG. 3 is a diagram for explaining the learning of an energization phase switching position. A three-phase four-pole brushless motor 15 is used as an example and energization phases for supplying a current are shown by N (upstream side) and S (downstream side).

When an energization phase switching position is not learned, as the initial energization phase is unknown, the energization phase is changed from the state of the totally closed position of the throttle valve (where the rotor of the brushless motor 15 is not rotated in a direction of closing the throttle valve 11 by the return spring 14) toward a direction of opening the throttle valve 11 (positions 301 to 303). The throttle valves first moves in an opening direction (position 306) and a position 307 where the opening of the throttle becomes stable is taken as a reference. (This stable position 307 can be detected by the microcomputer 201. That is, the microcomputer 201 can detect the position 307 by investigating the period from the time when the phase is changed to the time when the opening of the throttle is stabilized and by a method for reading the signal of the throttle opening sensor 13 after an elapse of a predetermined time or a method for reading the signal of the throttle opening sensor when the displacement of the throttle opening signal falls below a predetermined value after the phase is changed.) The energization phase pattern is changed sequentially in a direction of opening the throttle valve 11 based on the energization phase pattern at this point (positions 303 to 305). Six energization phase patterns in total are shown in 310. Positions 307 and 308 where the opening of the throttle valve becomes stable after an elapse of a fixed time 309 from the time when the the energization phase is changed are learned as energization phase switching positions in terms of throttle opening. Thereafter, energization phase switching positions from the totally closed position to the totally opened position of the throttle valve are stored as energization phase switching positions in a totally opening direction and energization phase switching positions in a totally closing direction are stored by changing the energization phase from the totally opened position of the throttle valve toward a totally closing direction. In this instance, when the difference between an energization phase switching position in a totally opening direction and an energization phase switching position in a totally closing direction is larger than a predetermined value, it is judged that learning is a failure and the learning of an energization phase switching position is carried out again. When the difference between the energization phase switching position in a totally opening direction and the energization phase switching position in a totally closing direction is smaller than the predetermined value, an average value of the energization phase switching positions in a totally opening direction and the energization phase switching positions in a totally closing direction is learned as an energization phase switching position.

Figure 4:
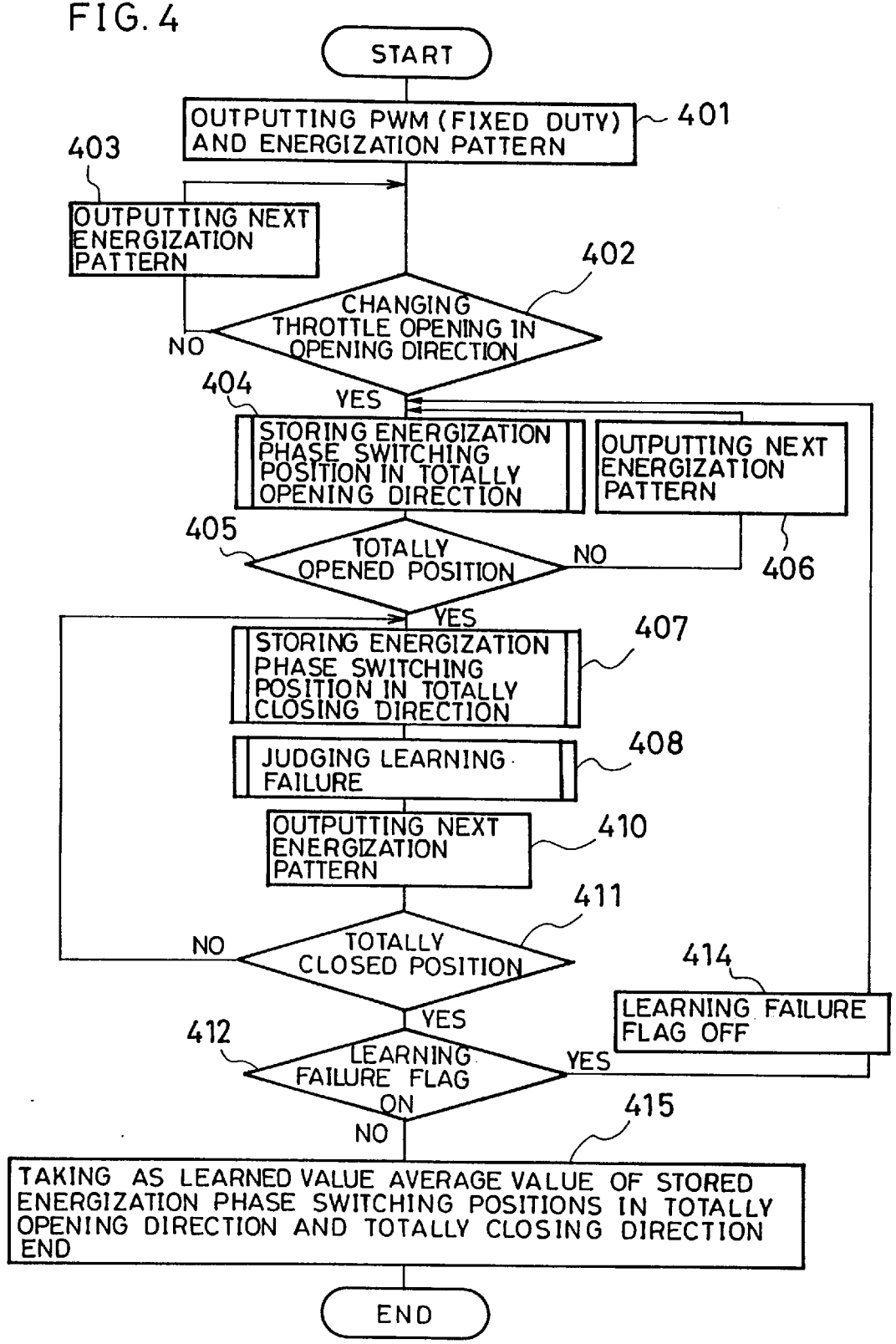
FIG. 4 is a flow chart showing the processing of learning an energization phase switching position in Embodiment 1.
Figure 5:
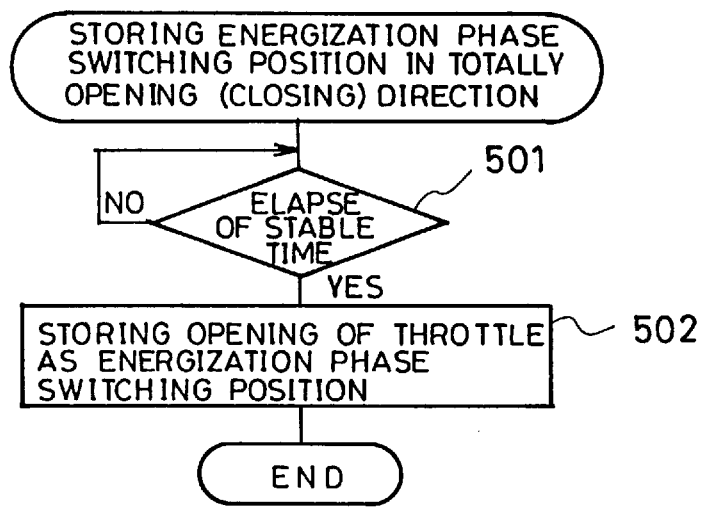
FIG. 5 is a flow chart showing the processing of learning an energization phase switching position in Embodiment 1.
Figure 6:
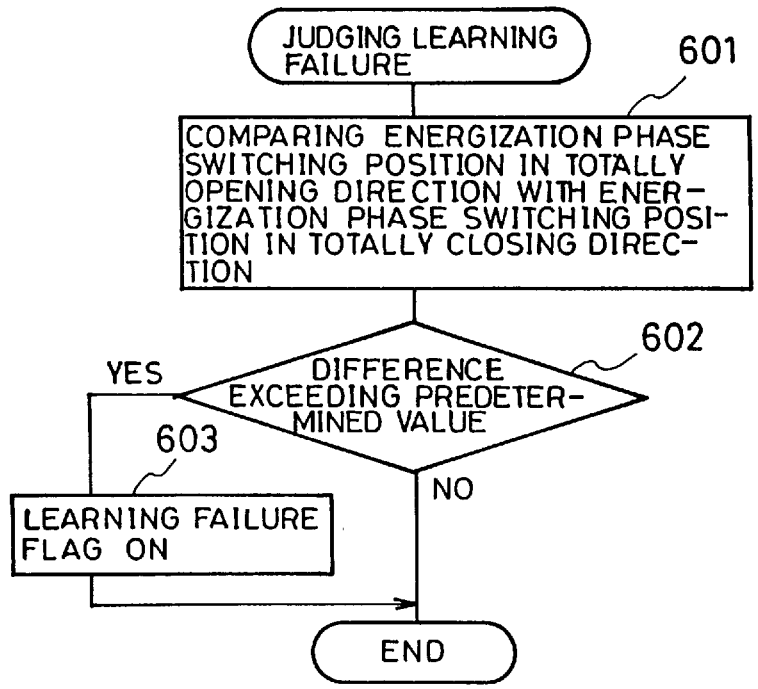
FIG. 6 is a flow chart showing the processing of judging a failure to learn an energization phase switching position in Embodiment 1.

The process of learning an energization phase switching position as described above is explained with reference to the flow charts of FIG. 4, FIG. 5 and FIG. 6. A fixed PWM duty signal and an energization phase pattern signal are output when the throttle valve is totally closed (step 401). The energization phase pattern signal is changed for an opening direction of the throttle valve until the opening of the throttle valve changes (steps 402 and 403). When the opening of the throttle valve has changed, energization phase switching positions in a totally opening direction are stored (step 404). After an elapse of a fixed time (step 501), a stable opening of the throttle valve is stored as an energization phase switching position in a totally opening direction (step 502). This processing is performed by changing the energization phase until the totally opened position of the throttle valve is reached (steps 405 and 406). After energization phase switching positions are stored until the totally opened position is reached, the processing of storing energization phase switching positions in a totally closing direction of the throttle valve is carried out (step 407). Thereafter, it is judged whether or not learning is a failure (step 408). An energization phase switching position in a totally opening direction and a corresponding energization phase switching position in a totally closing direction are compared (step 601). When the result of comparison is that the difference between these positions is larger than a predetermined value (step 602), it is judged that the learning of an energization phase switching position is a failure (step 603). This processing is performed until the totally closed position of the throttle valve is reached (step 411). When it is judged that the learning is a failure (step 412), the energization phase is changed for a totally closing direction of the throttle valve, the throttle valve is returned to its totally closed position, and then the learning of an energization phase switching position is carried out again. An average value of the last stored energization phase switching positions in a totally opening direction and energization phase switching positions in a totalling closing direction is learned as an energization phase switching position (step 415).

After the energization phase switching position has been learned, as shown in FIG. 1, an opening difference Δθ

($=\theta_o-\theta_r$) between a target throttle opening $\theta_o$ suitable for various car information (such as opening of accelerator, engine speed, car speed, etc.) and an actual opening $\theta_r$ obtained from the throttle opening sensor 13 is input into the motor control means 22. When the opening difference $\Delta q$ is positive, the motor control means 22 increases the phase current of the brushless motor 15 because the actual opening of the throttle valve falls below the target opening, and when the opening difference $\Delta q$ is negative, the motor control means 22 reduces the phase current of the brushless motor 15 because the actual opening of the throttle valve goes beyond the target opening. A PID controller is commonly used to calculate a PWM duty signal (phase current) from the opening difference $\Delta\theta$. The PID controller serves to control the phase current represented by the following equation to ensure that the opening difference $\Delta\theta$ becomes null.

$$duty = Kp \cdot \Delta\theta + K1 \cdot \Sigma\Delta\theta dt + Kd \cdot \Delta\theta/dt$$

Duty represents a PWM duty signal calculated by the PID controller, Kp a proportional gain, K1 an integral gain, and Kd a differential gain. The PWM duty signal obtained above is output from the microcomputer 201 to the motor drive means 23. The microcomputer 201 determines the energization phase pattern based on the output of the throttle valve opening signal and the learned value of the energization phase switching position and outputs it to the motor drive means 23. The motor drive means 23 supplies a current to a desired phase by causing the drivers 23a and 23b which have received the energization phase switch signal to drive switching elements corresponding to the signal and by driving the switching element groups on an upstream side using the PWM duty signal.

According to Embodiment 1 of the present invention as described above, a rotor position detector for changing the stator winding of the brushless motor is made unnecessary by the rotor magnetic pole position learning means for detecting and learning a magnetic pole position (energization phase switching position) of the rotor of the brushless motor from the output of the throttle opening sensor. Since the brushless motor is driven stepwise and a magnetic pole position of the rotor of the brushless motor is detected and learned by means of the rotor magnetic pole position learning means, a rotor position detector required for changing the stator winding of the brushless motor is not required. In addition, the accuracy of learning a magnetic pole position of the rotor can be enhanced by means of the rotor magnetic pole position learning means which learns as a rotor magnetic pole position an average value of learned values of rotor magnetic pole positions (energization phase switching position) from the totally closed position of the throttle valve toward a totally opening direction and learned values of rotor magnetic pole positions from the totally opened position of the throttle valve toward a totally closing direction. Further, the accuracy of learning a rotor magnetic pole position can be enhanced by means of the rotor magnetic pole position learning means which carries out the processing of learning a rotor magnetic pole position (energization phase switching position) again when it is judged that learning is a failure. Moreover, the accuracy of learning a rotor magnetic pole position can be enhanced by means of the rotor magnetic pole position learning means which judges that learning is a failure when the difference between a learned value in a direction of opening the throttle valve and a learned value in a direction of closing the throttle valve is larger than a predetermined value and carries out the processing of learning a rotor magnetic pole position energization phase switching position) again. As a result, an intake air amount control unit for an engine which is inexpensive and has excellent controllability can be obtained.

Embodiment 2

Figure 7:
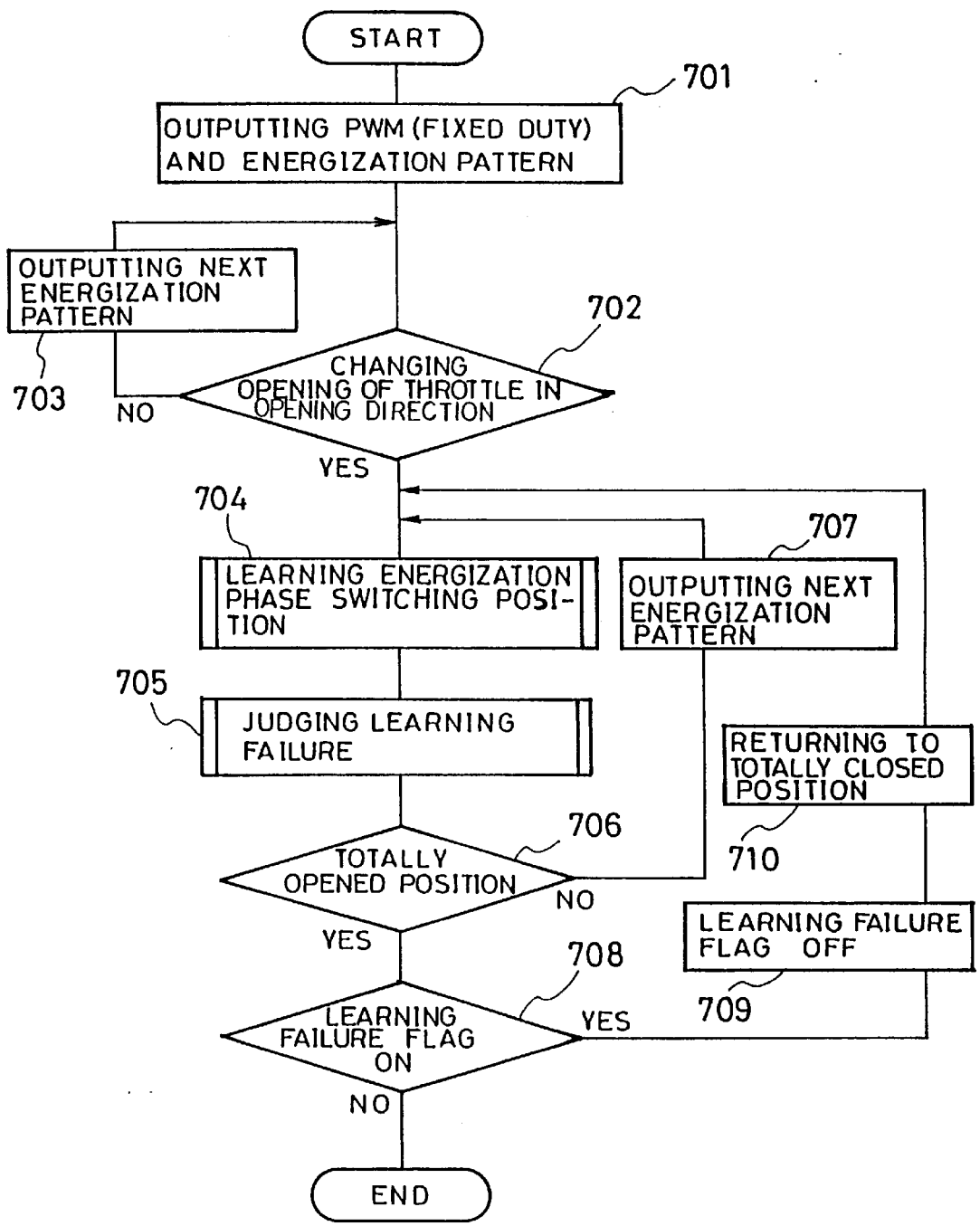
FIG. 7 is a flow chart showing the processing of judging whether or not the learning of an energization phase switching position is a failure in Embodiment 2.
Figure 8:
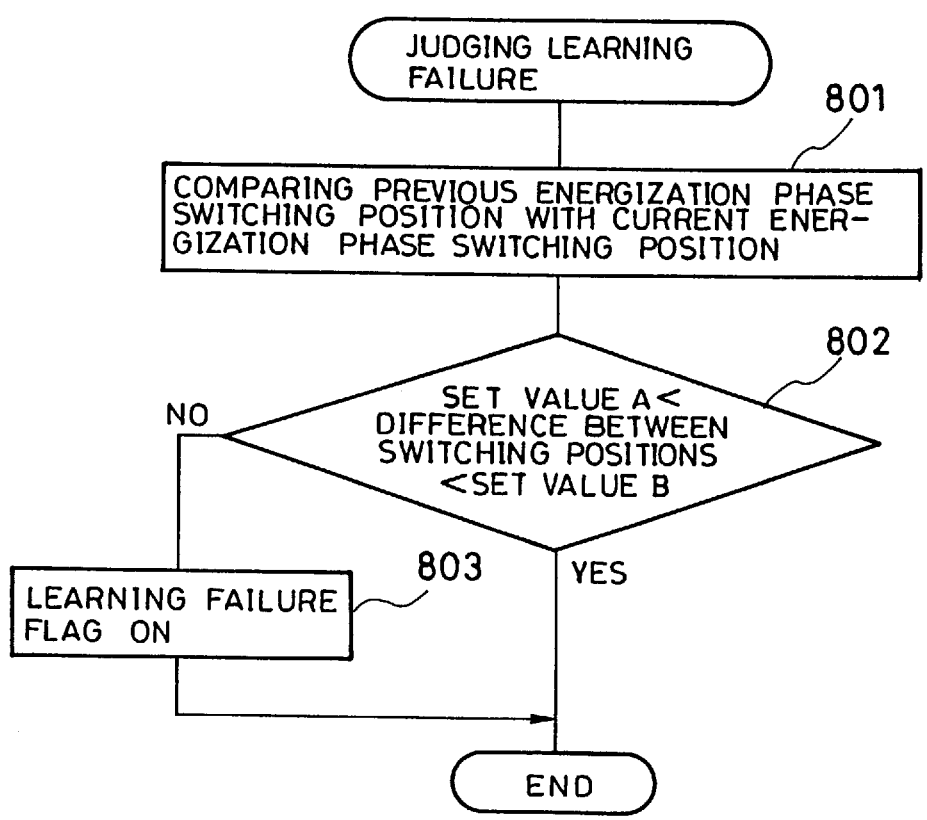
FIG. 8 is a flow chart showing the processing of judging whether or not the learning of an energization phase switching position is a failure in Embodiment 2.

The configuration of an intake air amount control unit for an engine according to Embodiment 2 of the present invention is the same as in FIG. 1. How to determine a learning failure by means of the energization phase switching position learning means (rotor magnetic pole position learning means) in Embodiment 2 of the present invention is explained with reference to the flow charts of FIG. 7 and FIG. 8. First, a fixed PWM duty signal and an energization phase pattern signal are output when the throttle valve is totally closed (step 701). The energization phase pattern signal is changed for a direction of opening the throttle valve until the opening of the throttle valve changes (steps 702 and 703). When the opening of the throttle valve has changed, energization phase switching positions are learned (step 704) and then it is judged whether or not learning is a failure (step 705). When it is judged that learning is a failure, the previous energization phase switching position and the current energization phase switching position are compared (step 801). As the result of comparison, when the difference between these two positions falls between a set value A and a set value B, it is judged that learning is successful and when not, it is judged that learning is a failure (step 803). As for the above set values A and B, since the energization phase is changed every 30° in a three-phase four-pole brushless motor, A is set to 10° and B to 50°. The processing of judging whether or not learning is a failure is performed until the totally opened position of the throttle valve is reached (step 706). When it is judged that learning is a failure (step 708), the energization phase is changed for a direction of totally closing the throttle valve and the learning of an energization phase switching position is carried out again after the throttle valve is returned to its totally closed position. When learning is successful (step 709), this processing is completed.

As described above, according to Embodiment 2 of the present invention, since there is provided the rotor magnetic pole position learning means which judges that learning is a failure when the interval between learned values of rotor magnetic pole positions (energization phase switching interval) is larger than a predetermined value or smaller than a predetermined value and carries out the processing of learning a rotor magnetic pole position again, the accuracy of learning a rotor magnetic pole position can be enhanced, As a result, an intake air amount control unit for an engine which is inexpensive and has excellent controllability can be obtained.

Embodiment 3

Figure 9:
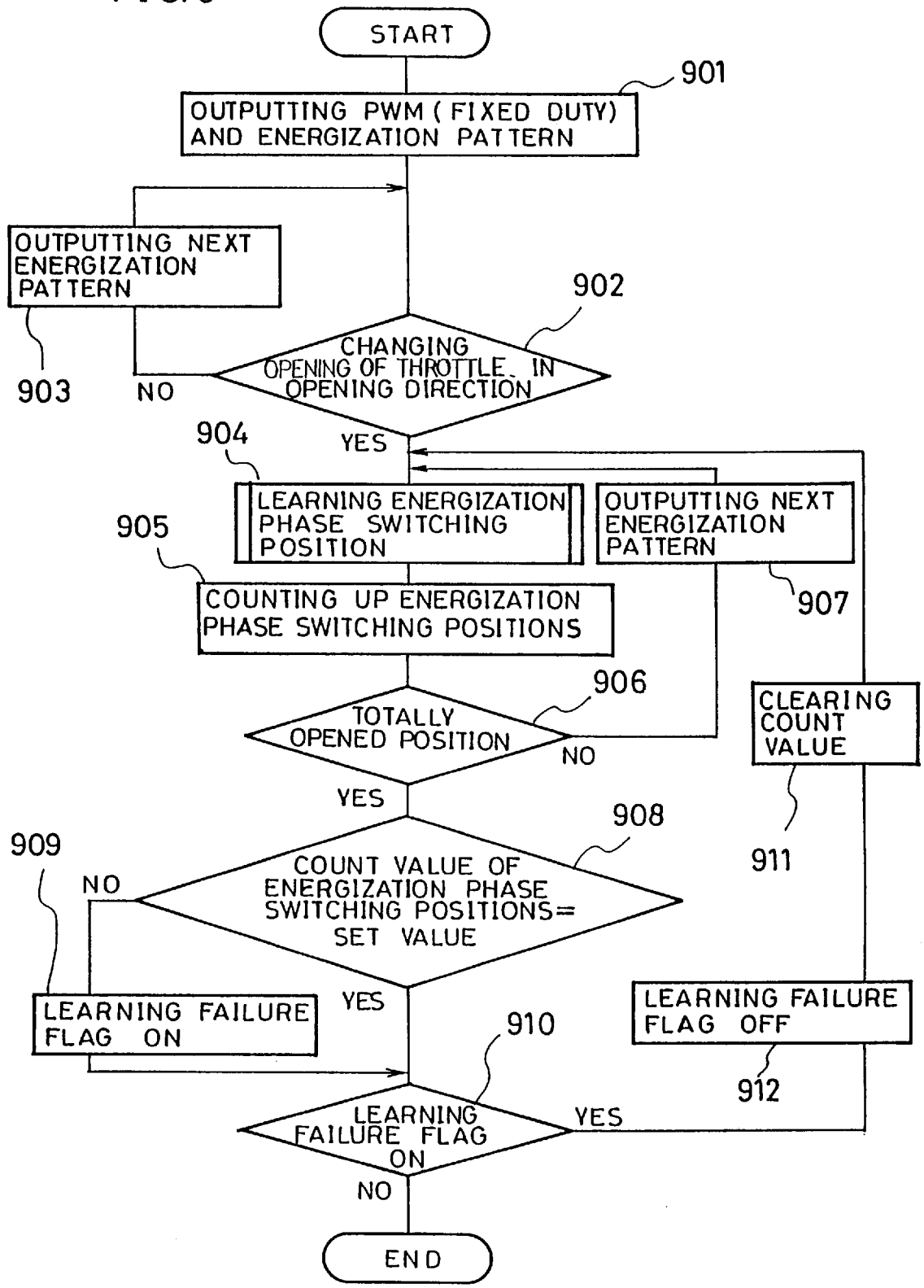
FIG. 9 is a flow chart showing the processing of judging whether or not the learning of an energization phase switching position is a failure in Embodiment 3.

The configuration of an intake air amount control unit for an engine according to Embodiment 3 of the present invention is the same as in FIG. 1. How to determine a learning failure by means of the energization phase switching position learning means (rotor magnetic pole position learning means) in Embodiment 3 of the present invention is explained with reference to the flow chart of FIG. 9. First, a fixed PWM duty signal and an energization phase pattern signal are output when the throttle valve is totally closed (step 901). The energization phase pattern signal is changed for a direction of opening the throttle valve until the opening of the throttle valve changes (steps 902 and 903). When the opening of the throttle valve has changed, energization phase switching positions are learned (step 904) and then the number of energization phase switching positions are counted up (step 905). The processings of steps 904 and 905 are performed by changing the energization phase pattern signal until the totally opened position of the throttle valve is reached (steps 906 and 907). When the totally opened position is reached, a count value of energization phase switching positions and a set value are compared (step 908). When the count value of energization phase switching positions and the set value are not equal, it is judged that learning is a failure (step 909). When they are equal, the count value is cleared to return the throttle valve to its totally closed position (steps 910 and 911). When learning is successful (step 912), this processing is completed. As for the set value in step 908, according to the specifications of the brushless motor, reduction gear and throttle actuator, the number of energization phase switching positions from the totally closed position of the throttle valve to the totally opened position thereof is taken as the set value.

As described above, according to Embodiment 3 of the present invention, since there is provided the rotor magnetic pole position learning means which judges that learning is a failure when the number of rotor magnetic pole positions (energization phase switching positions) it learns while the throttle valve changes from its totally closed position to its totally opened position is not equal to a set value, and carries out the processing of learning a rotor magnetic pole position (processing of learning a energization phase switching position) again, the accuracy of learning a rotor magnetic pole position can be enhanced. As a result, an intake air amount control unit for an engine which is inexpensive and has excellent controllability can be obtained.

Embodiment 4

Figure 10:
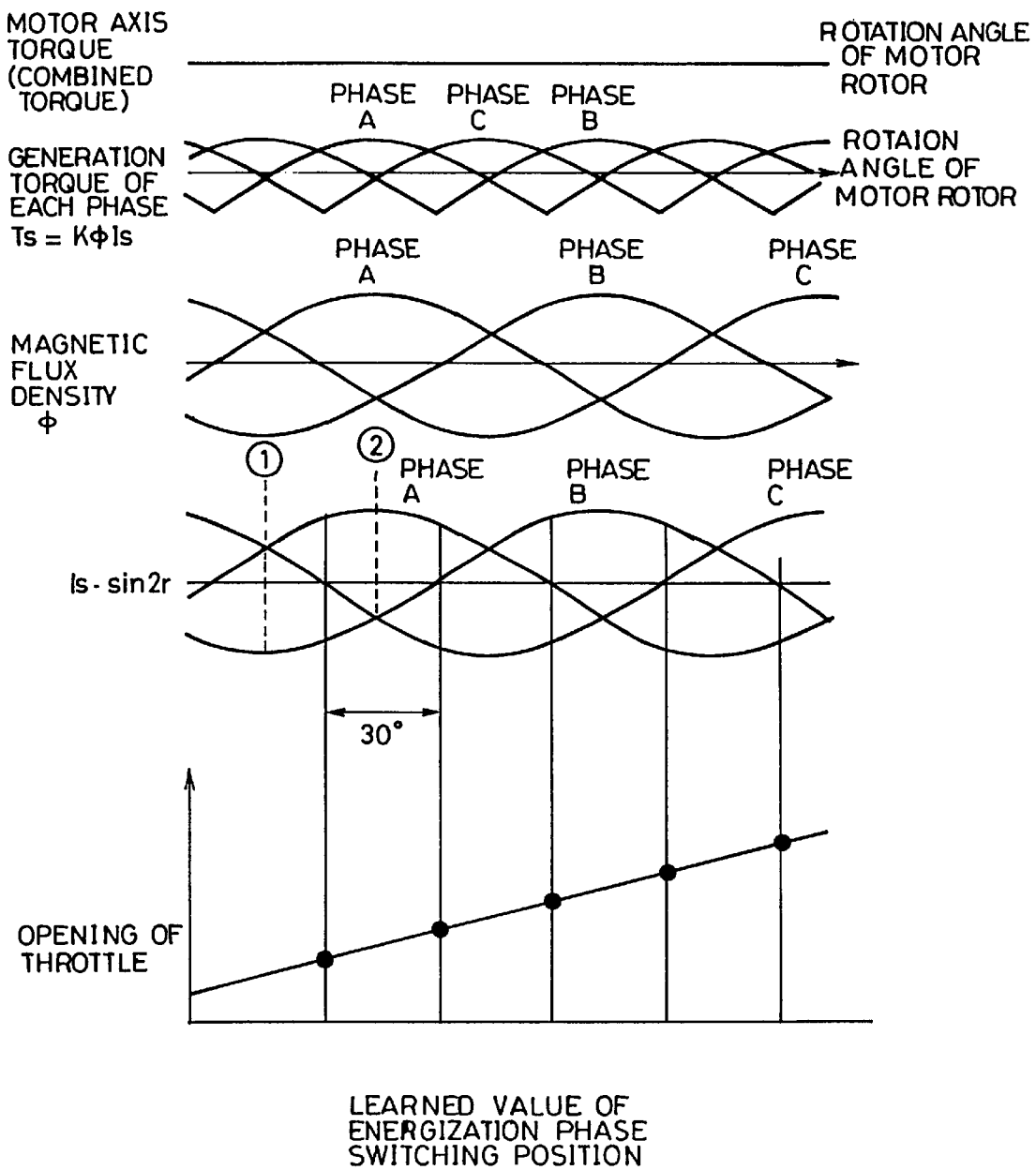
FIG. 10 is a diagram showing the operation principle of an energization system in Embodiment 4.

A description is first given of a three-phase energization system related to Embodiment 4 of the present invention with reference to the timing chart of FIG. 10. In FIG. 10, if a current Is of a sine wave similar to and having the same phase as the magnetic flux density $\Phi$ is supplied to each phase (each stator winding) when the stator winding of the brushless motor is excited and its rotor intersects the magnetic flux density $\Phi$ of a sine wave generated by each stator winding due to rotation thereof, a generation torque of each phase caused by energization can be expressed by the following equation.

$Ts = k \cdot \Phi \cdot Is$ (k is a constant)

The rotor torque of the brushless motor is expressed by a combined torque of the generating torques Ts of phases A to C and an output torque free from torque ripple with respect to the rotation angle of the rotor is theoretically obtained. This energization system is called "three-phase energization system". Generally speaking, since this system needs to change a supply current to each phase by a sine wave with respect to the rotation angle of the rotor, the rotation angle of the rotor must be detected accurately. Embodiment 4 of the present invention implements this 3-phase energization system using learned values of energization phase switching positions and a signal from the throttle opening sensor. This embodiment is described with reference to FIG. 10 and FIG. 11. Only differences from Embodiment 1 are described hereinunder.

A PWM duty signal calculated from a difference $\Delta\theta$ and an actual opening $\theta r$ from the throttle opening sensor and an energization phase selection signal are output from the motor control means 22A to the motor drive means 23A. The motor control means 22A comprises rotation angle detection means 22d. The motor drive means 23A comprises an AND logic group 23h for driving an upstream-side drive stage, an AND logic group 23i for driving a downstream-side drive stage, and an inverted logic group 23j in parallel to the energization phase selection signals 1 to 3 of the AND logic groups 23h and 23i. The PWM duty signal is input into the AND logic group 23h independently. The relationship between PWM duty and the rotation angle of the rotor can be expressed by the following equations.

PWM duty 1=PWM duty×sin 2γ

PWM duty 2=PWM duty×sin 2(γ−60°)

PWM duty 3=PWM duty×sin 2(γ+60°)

γ represents a rotation angle of the rotor.

The energization phase selection signal can be expressed by a function of γ. energization phase selection signal (1, 2, 3)=f(γ)

Figure 11:
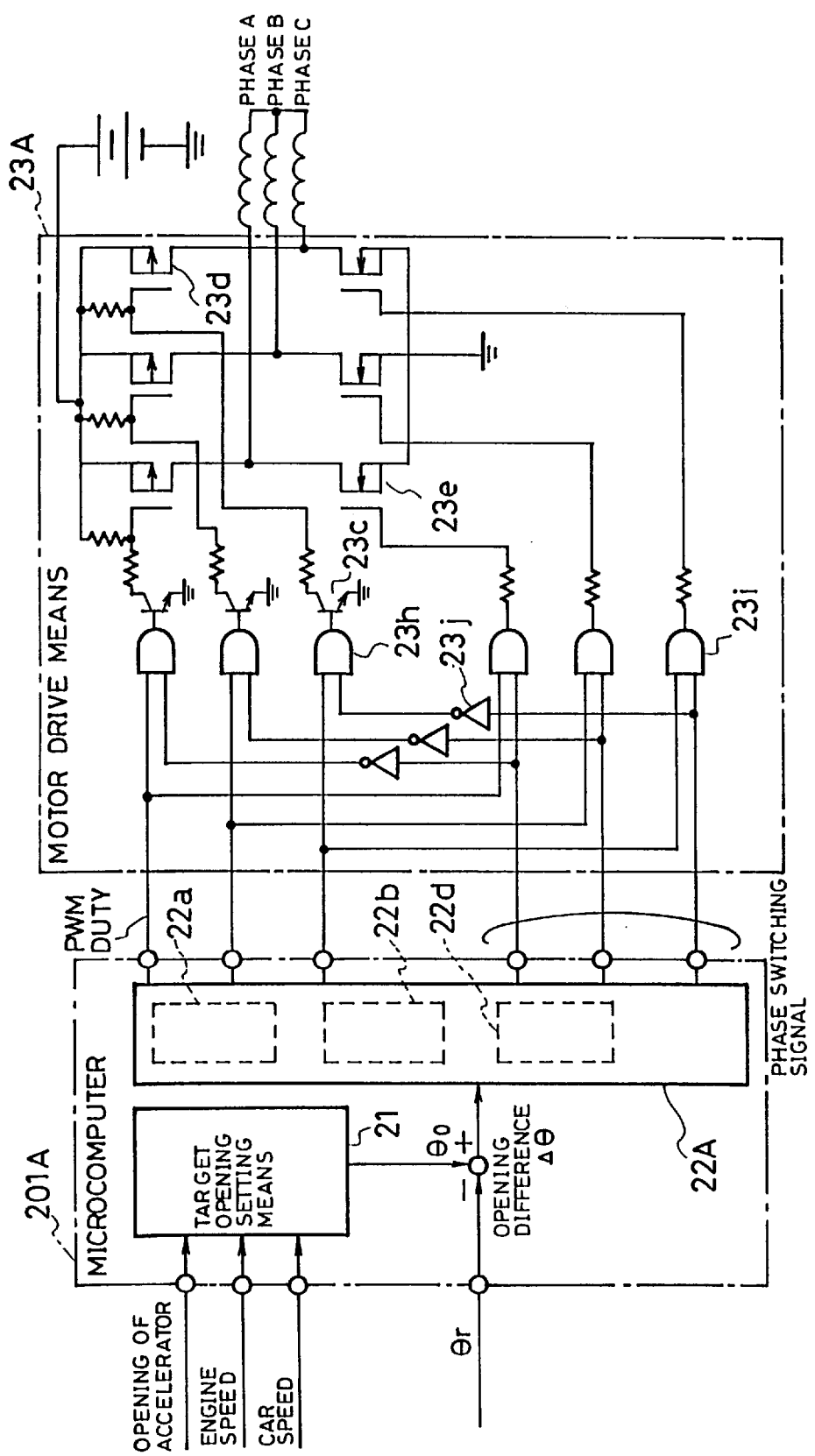
FIG. 11 is a circuit diagram of a controller in Embodiment 4.

A description is subsequently given of operation. First, energization phase switching positions are learned. Although the description of this learning is almost the same as that of Embodiment 1, in the circuit configuration as shown in FIG. 11, only a PWM duty signal for a phase to be energized is output and an energization phase switching pattern is such that "low" is output when the upstream-side drive stage is turned on and for a phase not to be energized and "high" is output when the downstream-side drive stage is turned on. Thus two-phase energization is carried out. The learning system is the same as in Embodiment 1. As explained in Embodiment 1, the motor control means 22A selects an energization phase based on an energization phase switching position learned by the rotor magnetic pole position learning means 22b (energization phase switching position learning means) and a signal from the throttle opening sensor and outputs the selected phase to the motor drive means 23A. The motor control means 22A also calculates the above PWM duties 1 to 3 and outputs them to the motor drive means 23A. For instance, such an energization phase selection signal is output to cause a current to be supplied to phase B from phases A and C at point 1 in FIG. 10 and to phases B and C from phase A at point 2. However, since the rotation angle of the rotor required for the calculation of PWM duties is detected only from a learned value of an energization phase switching position, a rotation angle γ of the motor is obtained from an actual opening θr from the throttle opening sensor and a gear ratio ε of the reduction gear 16 between learned values of energization phase switching positions.

γ=ε×θr

ε represents a gear ratio of the reduction gear 16.

The rotation angle of the motor can be obtained from the above equation based on the change amount of throttle opening from the energization phase switching position, the energization phase can be changed at an actual energization phase switching point, and PWM duties 1 to 3 for supplying a current in the form of a sine wave can be obtained.

As described above, according to Embodiment 4, since there is provided the rotation angle detection means for obtaining a rotation angle of the rotor of the brushless motor, a high-precision position detector is not required and a sudden torque change of the brushless motor which occurs when the rotor winding to be energized is changed can be prevented. As a result, an intake air amount control unit for an engine which is inexpensive and has excellent controllability can be obtained.

Embodiment 5

Figure 12:
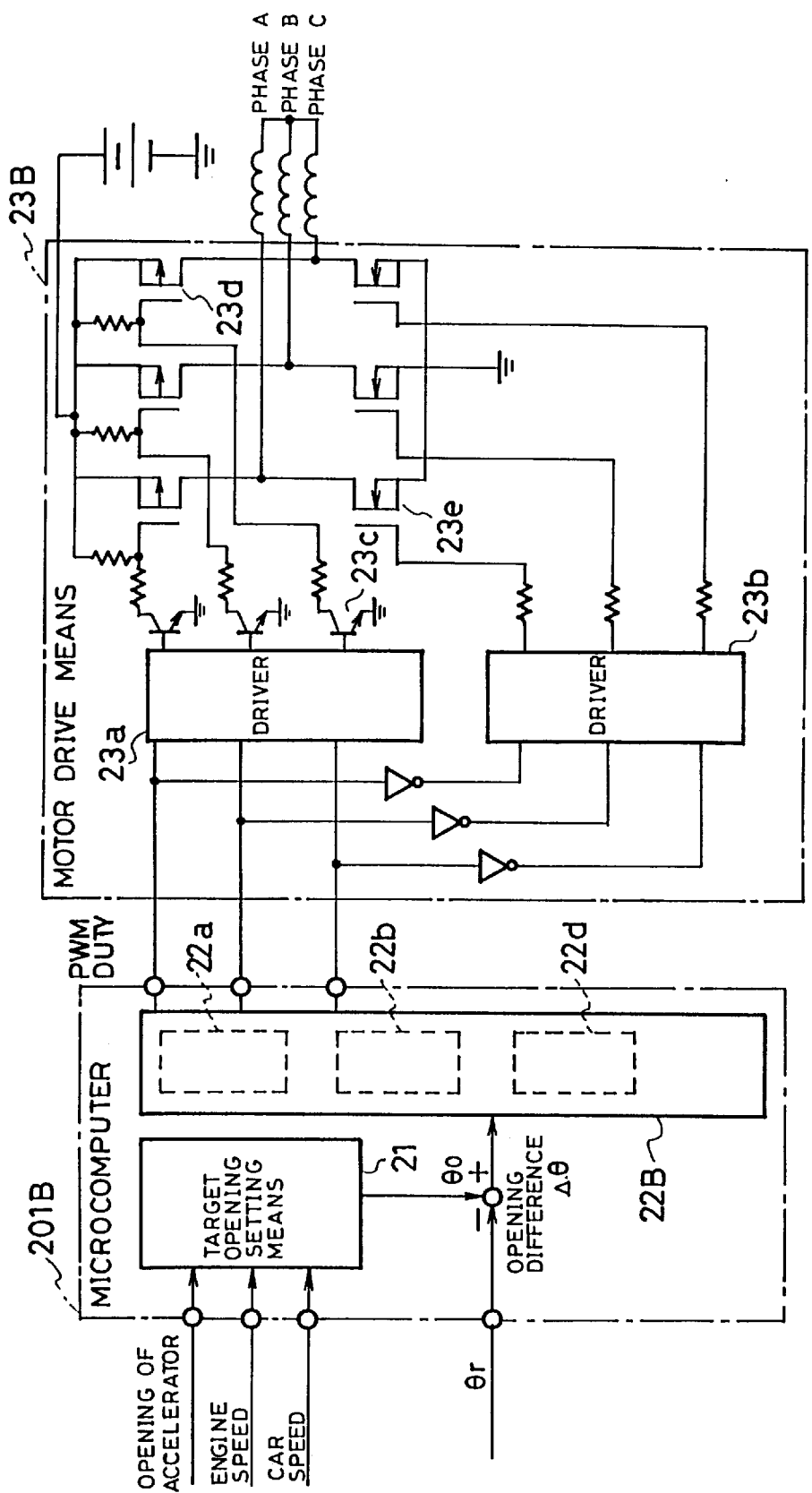
FIG. 12 is a circuit diagram of a controller in Embodiment 5.
Figure 13:
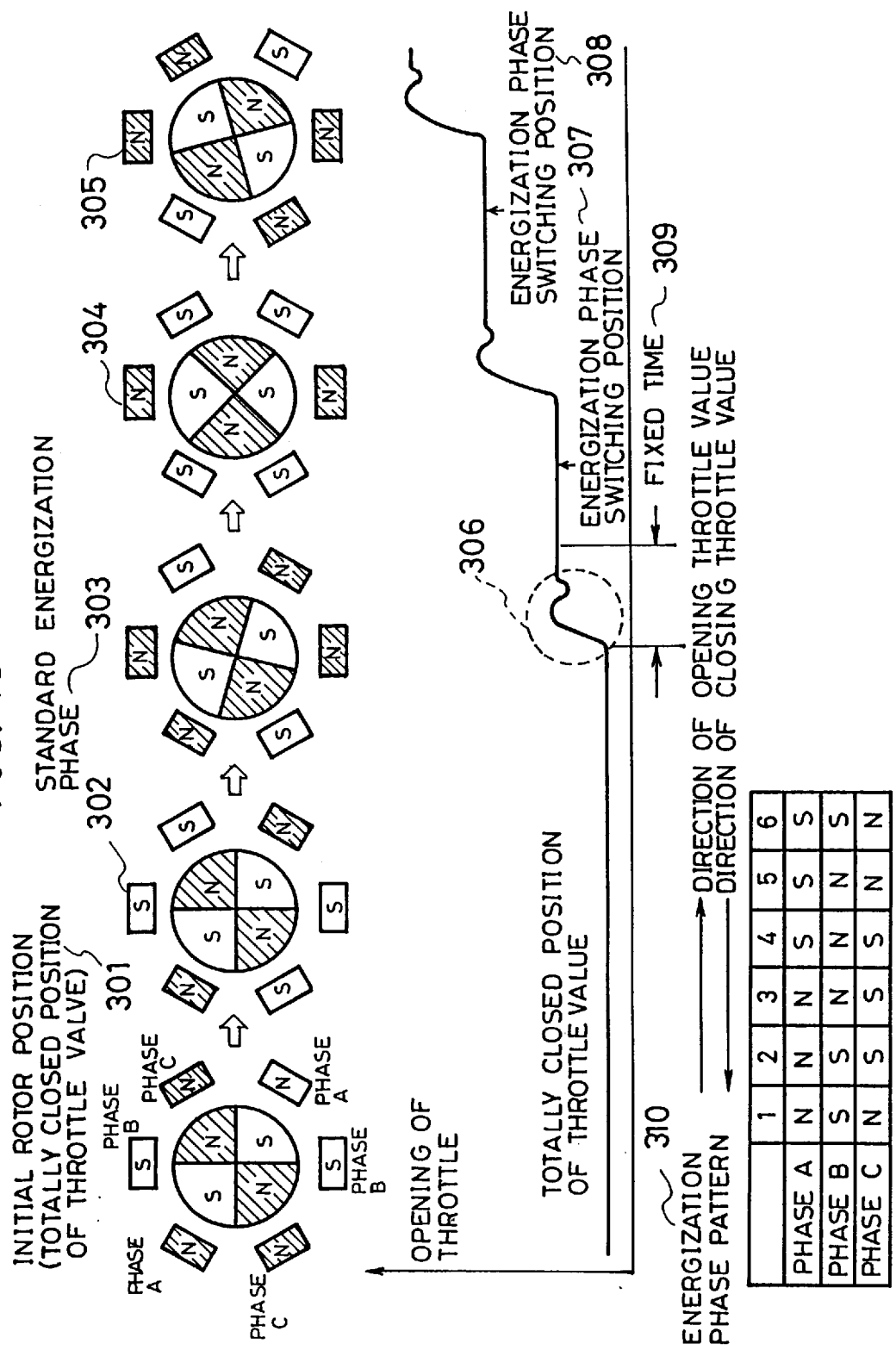
FIG. 13 is a diagram explaining the learning of an energization switch position in Embodiment 5.
Figure 14:
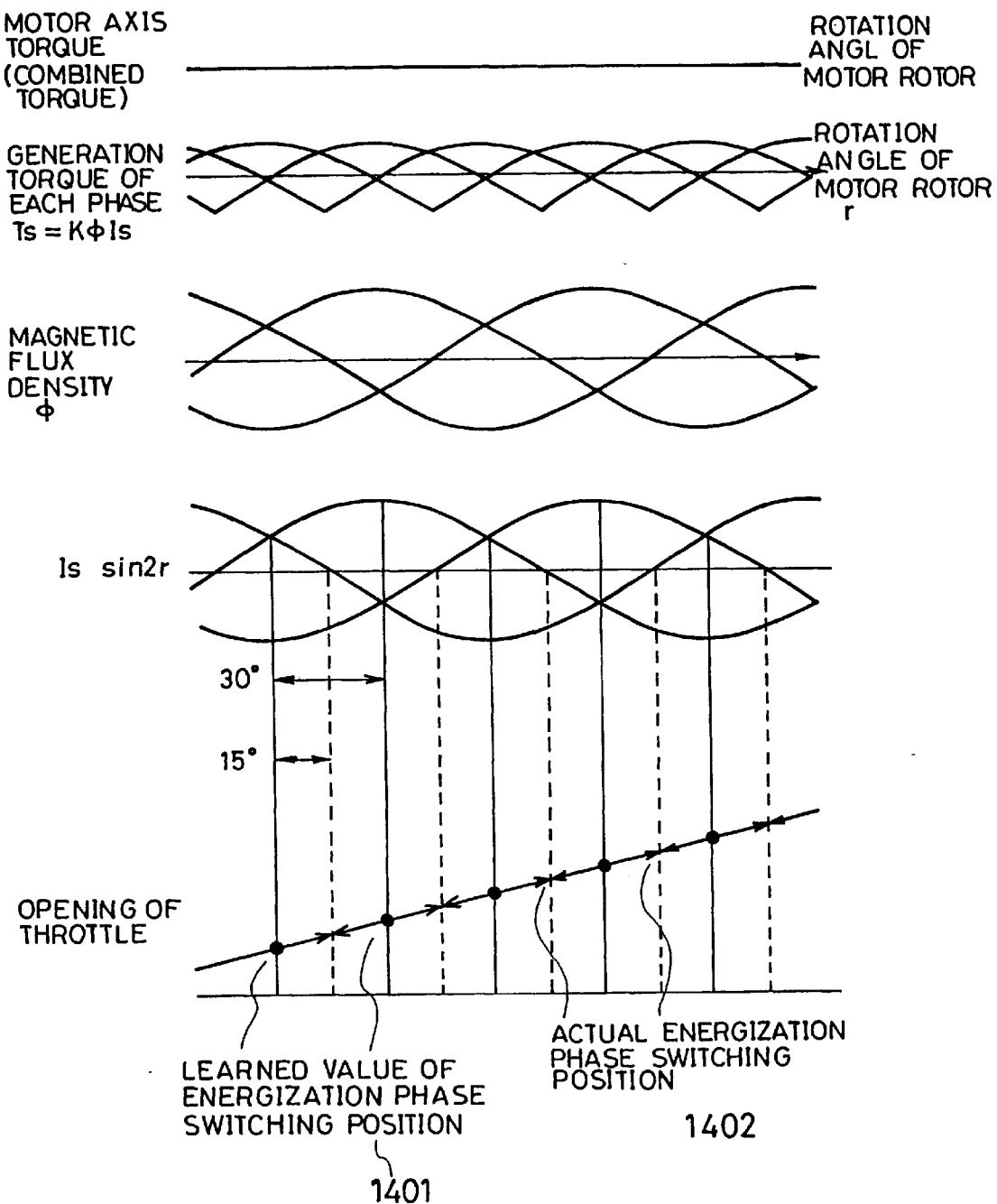
FIG. 14 is a diagram showing the operation principle of an energization system in Embodiment 5.

FIG. 12 is a circuit diagram of a microcomputer and motor drive means according to Embodiment 5. When two-phase energization cannot be performed as in the circuit configuration of FIG. 12, the learning of an energization phase switching position is performed by three-phase energization. This method is almost the same as in Embodiment 1, but as shown in FIG. 13, the energization phase pattern is changed from two phases to three phases. The operation of learning an energization phase switching position is such as explained in Embodiment 1. However, as shown in FIG. 14, a learned value 1401 of an energization phase switching position is different from an actual energization phase switching position 1402 by 15° in terms of the rotation angle of the rotor. For instance, an energization phase selection signal is output to cause a current to be supplied from phases A and C to phase B at a point 1 in FIG. 10 and from phase A to phases B and C at a point 2. However, since an actual energization phase switching position and the rotation angle of the rotor required for the calculation of PWM duties are detected only from a learned value of an energization phase switching position, a rotation angle γ of the motor is obtained from an actual opening θr from the throttle opening sensor and a gear ratio ε of the reduction gear 16 between learned values of energization phase switching positions.

$$\gamma = \epsilon \times \theta r$$

ε represents a gear ratio of the reduction gear 16.

The rotation angle of the motor can be obtained from the above equation based on the change amount of throttle opening from the energization phase switching position, the energization phase can be changed at an actual energization phase switching point, and PWM duties 1 to 3 for supplying a current in the form of a sine wave can be obtained.

As described above, according to Embodiment 5, a sudden torque change of the brushless motor which occurs when the stator winding to be energized is changed can be prevented with an inexpensive system by obtaining a rotation angle by interpolating between a learned energization phase switching position and the next energization phase switching position with the output signal of the throttle opening sensor.

As described on the foregoing pages, according to the present invention, since there is provided rotor magnetic pole position learning means, a rotor position detector required for changing the stator winding is not required and an intake air amount control unit for an engine which is inexpensive and has excellent controllability can be obtained.

According to the present invention, since the rotor magnetic pole position learning means of the invention detects and learns a magnetic pole position of the rotor from the output of the throttle opening sensor, a rotor position detector is not required.

According to the present invention, since there is provided rotor magnetic pole position learning means for learning a magnetic pole position of the rotor by driving stepwise the brushless motor of the invention, a rotor position detector required for changing the stator winding is not required and an intake air amount control unit for an engine which is inexpensive and has excellent controllability can be obtained.

According to the present invention, since the rotor magnetic pole position learning means of the invention learns as a rotor magnetic pole position an average value of learned values of rotor magnetic pole positions from the totally closed position of the throttle valve toward a totally opening direction and learned values of rotor magnetic pole positions from the totally opened position of the throttle valve toward a totally closing direction, the accuracy of learning a magnetic pole position of the rotor can be enhanced and controllability can be improved.

According to the present invention, since the rotor magnetic pole position learning means of the invention comprises learning failure judging means and carries out the processing of learning a magnetic pole position of the rotor again when the learning failure judging means judges that learning is a failure, the accuracy of learning a magnetic pole position of the rotor can be enhanced and controllability can be improved.

According to the present invention, since the rotor magnetic pole position learning means of the invention judges that learning is a failure when the difference between a learned value in a direction of opening the throttle valve and a learned value in a direction of closing the throttle valve is larger than a predetermined value and carries out the processing of learning a magnetic pole position of the rotor again, the accuracy of learning a magnetic pole position of the rotor can be enhanced and controllability can be improved.

According to the present invention, since the rotor magnetic pole position learning means of the invention judges that learning is a failure when the interval between learned values of rotor magnetic pole positions is larger than a predetermined value or less than a predetermined value and carries out the processing of learning a magnetic pole position of the rotor again, the accuracy of learning a magnetic pole position of the rotor can be enhanced and controllability can be improved.

According to the present invention, since the rotor magnetic pole position learning means of the invention judges that learning is a failure when the number of magnetic pole positions of the rotor from the totally closed position of the throttle valve to the totally opened position thereof is not equal to a set value and carries out the processing of learning a magnetic pole position of the rotor again, the accuracy of learning a magnetic pole position of the rotor can be enhanced and controllability can be improved.

According to the present invention, since there are provided PWM duty signal output means for calculating a phase current value to be supplied to each stator winding based on an opening difference between an actual opening of the throttle valve and a target opening of the throttle valve set by the target opening setting means independently for each stator winding and for outputting a PWM duty signal corresponding to each phase current value, rotor magnetic pole position learning means for detecting and learning a magnetic pole position of the rotor, rotation angle detection means for determining a stator winding to be energized from an opening of the throttle valve and a learned value of the rotor magnetic pole position learning means and obtaining a rotation angle of the rotor, and motor drive means for supplying a current to the brushless motor based on the PWM duty signal from the PWM duty signal output means and the rotation angle of the rotor from the rotation angle detection means, a sudden torque change of the brushless motor which occurs when the stator winding to be energized is changed can be prevented with an inexpensive system.

According to the present invention, since the rotor magnetic pole position learning means of the present invention detects and learns a magnetic pole position of the rotor from the output of the throttle opening sensor, a rotor position detector is not necessary.

According to the present invention, since the brushless motor is driven stepwise and the rotor magnetic pole position learning means learns a magnetic pole position of the rotor in the invention, a rotor position detector required for changing the stator winding is not necessary and an inexpensive intake air amount control unit for an engine can be obtained.

According to the present invention, since the rotor magnetic pole position learning means of the invention comprises learning failure judging means and carries out the processing of learning a magnetic pole position of the rotor again when the learning failure judging means judges that learning is a failure, the accuracy of learning a magnetic pole position of the rotor can be enhanced and controllability can be improved.

According to the present invention, since the rotation angle detection means of the invention determines a stator winding to be energized based on an opening of the throttle valve and a learned value of the rotor magnetic pole position learning means to obtain a rotation angle of the rotor, the effect of the invention can be attained.

According to the present invention, since the rotation angle is obtained by interpolating between a learned rotor magnetic pole position and the next rotor magnetic pole position with the output signal of the throttle opening sensor in the invention, a sudden torque change of the brushless motor which occurs when the stator winding to be energized is changed can be prevented with an inexpensive system.

What is claimed is:

1. An intake air amount control unit for an engine comprising:
    a throttle valve supported by a rotary axis in an intake air passage of an engine;
    a brushless motor having a rotor and stator windings connected to the rotary axis through a reduction gear;
    a throttle opening sensor for detecting an opening of the throttle valve by detecting a rotation angle of the rotary axis;
    target opening setting means for setting an opening of the throttle valve based on various car information;
    PWM duty signal output means for calculating a phase current value to be supplied to each of the stator windings based on an opening difference between an actual opening of the throttle valve obtained from the throttle opening sensor and a target opening of the throttle valve set by the target opening setting means independently for each stator winding and for outputting a PWM duty signal corresponding to the calculated phase current value;
    rotor magnetic pole position learning means for detecting and learning a magnetic pole position of the rotor;
    energization stator winding determining means for determining a stator winding to be energized from an opening of the throttle valve and a value learned by the rotor magnetic pole position learning means; and
    motor drive means for supplying a current to the brushless motor based on the PWM duty signal from the PWM duty signal output means and an energization phase selection signal corresponding to the stator winding to be energized determined by the energization stator winding determining means.

2. An intake air amount control unit for an engine according to claim 1, wherein the rotor magnetic pole position learning means detects and learns a magnetic pole position of the rotor according to the output of the throttle opening sensor.

3. An intake air amount control unit for an engine according to claim 1, wherein the brushless motor is driven stepwise and the rotor magnetic pole position learning means detects and learns a magnetic pole position of the rotor from a stepwise driven position of the brushless motor.

4. An intake air amount control unit for an engine according to claim 1, wherein the rotor magnetic pole position learning means learns as a magnetic pole position of the rotor an average value of learned values of the magnetic pole positions of the rotor from the totally closed position of the throttle valve toward a totally opening direction and learned values of the magnetic pole positions of the rotor from the totally opened position of the throttle valve toward a totally opening direction.

5. An intake air amount control unit for an engine according to claim 1, wherein the rotor magnetic pole position learning means comprises learning failure judging means and carries out the processing of learning a magnetic pole position of the rotor again when the learning failure judging means judges that learning is a failure.

6. An intake air amount control unit for an engine according to claim 5, wherein the rotor magnetic pole position learning means judges that learning is a failure when a difference between a learned value in a direction of opening the throttle valve and a learned value in a direction of closing the throttle valve is larger than a predetermined value and carries out the processing of learning a magnetic pole position of the rotor again.

7. An intake air amount control unit for an engine according to claim 5, wherein the rotor magnetic pole position learning means judges that learning is a failure when an interval between learned values of magnetic pole positions of the rotor is larger than a predetermined value or smaller than a predetermined value and carries out the processing of learning a magnetic pole position of the rotor again.

8. An intake air amount control unit for an engine according to claim 5, wherein the rotor magnetic pole position learning means judges that learning is a failure when the number of magnetic pole positions of the rotor learned from the totally closed position of the throttle valve to the totally opened position thereof is not equal to a set value and carries out the processing of learning a magnetic pole position of the rotor again.

9. An intake air amount control unit for an engine comprising:
    a throttle valve supported by a rotary axis in an intake air passage of an engine;
    a brushless motor having a rotor and stator windings connected to the rotary axis through a reduction gear;
    a throttle opening sensor for detecting an opening of the throttle valve by detecting a rotation angle of the rotary axis;
    target opening setting means for setting an opening of the throttle valve based on various car information;
    PWM duty signal output means for calculating a phase current value to be supplied to each of the stator windings based on an opening difference between an actual opening of the throttle valve obtained from the throttle opening sensor and a target opening of the throttle valve set by the target opening setting means independently for each stator winding and for outputting a PWM duty signal corresponding to the calculated phase current value;
    rotor magnetic pole position learning means for detecting and learning a magnetic pole position of the rotor;
    rotation angle detection means for obtaining a rotation angle of the rotor based on an opening of the throttle valve and a value learned by the rotor magnetic pole position learning means; and motor drive means for supplying a current to the brushless motor based on the PWM duty signal from the PWM duty signal output means and the rotation angle of the rotor from the rotation angle detection means.

10. An intake air amount control unit for an engine according to claim 9, wherein the rotor magnetic pole position learning means detects and learns a magnetic pole position of the rotor from the output of the throttle opening sensor.

11. An intake air amount control unit for an engine according to claim 9, wherein the brushless motor is driven stepwise and the rotor magnetic pole position learning means detects and learns a magnetic pole position of the rotor from a stepwise driven position of the brushless motor.

12. An intake air amount control unit for an engine according to claim 9, wherein the rotor magnetic pole learning means comprises learning failure judging means and carries out the processing of learning a magnetic pole position of the rotor again when the learning failure judging means judges that learning is a failure.

13. An intake air amount control unit for an engine according to claim 9, wherein the rotation angle detection means determines a stator winding to be energized based on an opening of the throttle valve and a value learned by the rotor magnetic pole position learning means to obtain a rotation angle of the rotor.

14. An intake air amount control unit for an engine according to claim 9, wherein the rotation angle detection means obtains a rotation angle by interpolating between a magnetic pole position of the rotor learned by the rotor magnetic pole position learning means and the next magnetic pole position of the rotor with the output signal of the throttle opening sensor.

* * * * *